(12) United States Patent
Tracey et al.

(10) Patent No.: US 6,626,219 B2
(45) Date of Patent: Sep. 30, 2003

(54) INNER TUBE COMPOSITIONS HAVING IMPROVED HEAT RESISTANCE CHARACTERISTICS

(75) Inventors: Donald S. Tracey, Kingwood, TX (US); Ilan Duvdevani, Houston, TX (US); Hsien-Chang Wang, Bellaire, TX (US); Takashi Takeda, Yokohama (JP); Shinichiro Yamashita, Kanagawa (JP); Arthur E. Parente, Houston, TX (US); Utpal Paul, Mumbai (IN)

(73) Assignee: ExxonMobil Chemical Patents Inc., Houston, TX (US)

(*) Notice: Subject to any disclaimer, the term of this patent is extended or adjusted under 35 U.S.C. 154(b) by 78 days.

(21) Appl. No.: 09/736,524

(22) Filed: Dec. 13, 2000

(65) Prior Publication Data

US 2002/0108691 A1 Aug. 15, 2002

Related U.S. Application Data

(60) Provisional application No. 60/173,346, filed on Dec. 28, 1999.

(51) Int. Cl.[7] .................................................. B60C 5/02
(52) U.S. Cl. ...................................... 152/511; 152/510
(58) Field of Search ............................... 152/511, 512, 152/510, 195

(56) References Cited

U.S. PATENT DOCUMENTS

| | | |
|---|---|---|
| 4,417,012 A | 11/1983 | Moniotte |
| 4,520,154 A | 5/1985 | Moniotte |
| 4,587,296 A | 5/1986 | Moniotte |
| 4,728,274 A | 3/1988 | Siegenthaler |
| 5,333,662 A | 8/1994 | Costemalle et al. ......... 152/510 |
| 5,426,147 A | 6/1995 | Laube et al. |
| 5,508,354 A | 4/1996 | Talma et al. |
| 5,576,373 A | 11/1996 | Kresge et al. |
| 5,650,454 A | 7/1997 | Hoover et al. |
| 5,698,540 A | 12/1997 | Katayama et al. |
| 5,698,640 A | 12/1997 | Duvdevani et al. |
| 5,807,629 A * | 9/1998 | Elspass et al. ............... 152/450 |

FOREIGN PATENT DOCUMENTS

WO   Wo 94/22680   10/1994

OTHER PUBLICATIONS

Klingensmith et al., "Rubber Compounding; 4.Vulcanization," Kirk–Othmer Encyclopedia of Chemical Technology (1997).*

Polymeric Materials Encyclopedia, vol. 5, H–L, CRC Press, 1996, New York "Isobutylene Copolymers (Commercial)" by Jay Dias, pp. 3484–3492.

* cited by examiner

*Primary Examiner*—Geoffrey L. Knable
(74) *Attorney, Agent, or Firm*—Leandro Arechederra

(57) ABSTRACT

Halogenated isobutylene-co-paramethylstyrene polymer, preferably brominated isobutylene-co-paramethylstyrene polymer (BIMS) and blends thereof, preferably blends of isobutylene based rubber, show improved heat resistance versus butyl inner tube compositions and retain the superior barrier properties of butyl inner tube compositions versus inner tube compositions with butyl/EP blends.

20 Claims, No Drawings

INNER TUBE COMPOSITIONS HAVING IMPROVED HEAT RESISTANCE CHARACTERISTICS

CROSS-REFERENCE TO RELATED APPLICATIONS

This Application is based on Provisional Application U.S. Ser. No. 60/173,346 filed Dec. 28, 1999.

FIELD OF INVENTION

The present invention relates to tire inner tubes made from isobutylene-co-paramethylstyrene, elastomers, and blends thereof

BACKGROUND OF THE INVENTION

Tire inner tubes are ordinarily made from butyl rubber cross-linked or vulcanized to form a tube having good heat stability and physical properties. However, high temperatures and extreme conditions of use cause repeated expansion and contraction of the tire inner tubes. As a result, inner tubes made from these polymers have a limited useful life. For example, in many developing nations having bad roads and tropical and sub-tropical conditions, inner tubes are still used within tires. Inner tubes comprised of isobutylene based rubbers, such as butyl rubber, and chlorobutyl rubber, and EPDM rubber, do not have the proper properties to survive severe conditions of overloading and high temperatures. The inner tubes degrade, lose air, and become sticky, adhering to the tire. The inner tube cannot be removed from the tire, the tire cannot be retreaded, and thus the tire must be scrapped. These deficiencies in current inner tube compositions lead to excessive waste of tire composition and added cost of replacing a tire.

Most present day inner tube compositions lack the superior heat aging properties needed to produce a reliable, improved air impermeable tire inner tube capable of performing in severe service applications such as high speed, bumpy roads and overloading situations, which all may cause rapid deformation.

Inner tubes comprising butyl rubber are superior in barrier properties to inner tubes formed from any other rubber. However, certain applications require improved heat resistance which is normally obtained by blending Ethylene-Propylene (EP) or EPDM rubber with butyl in inner tube compounds. However, blending of EP or EPDM rubbers increases the air permeability of the rubbers.

U.S. Pat. No. 5,698,640 teaches isobutylene-co-brominated paramethylstyrene (EXXPRO™ ExxonMobil Chemical Company) bladders made from a low-bromine formulation. However, this low-bromine formulation does not possess proper cure properties needed for the production of inner tubes. The low bromine polymer will not develop the tensile and modulus strength needed for inner tubes. The cure system disclosed in U.S. Pat. No. 5,698,640 is considered to be too "scorchy" for inner tube processing.

U.S. Pat. No. 5,576,373 teaches the use of layered silicates in inner tubes while WO 9422680 includes a laundry list of rubbers that may be used for a variety of applications.

U.S. Pat. No. 5,650,454 discloses an elastomer composition comprising an isobutylene-paramethylstyrene copolymer rubber that may be used in inner tubes. The composition must contain an additive comprising a cross-linked fatty acid and a starch. The additive is said to increase tear resistance, but there is no suggestion that the compositions formed have enhanced thermal stability.

It has been known to use 1,6-hexamethylene-bis(sodium thiosulfate) (HTS, Flexsys Corp.) as a stabilizing agent, more specifically as a reversion inhibitor, in sulfur-vulcanized master batches of high diene rubber. See U.S. Pat. Nos. 4,417,012; 4,520,154; and 4,587,296 to Moniotte; and U.S. Pat. No. 5,508,354 to Talma et al. herein incorporated by reference for purposes of U.S. patent practice.

There is a need for an inner tube that will have enhanced thermal stability and physical properties under severe temperature and operating conditions.

SUMMARY OF THE INVENTION

It has been found that halogenated isobutylene-co-paramethylstyrene copolymer, preferably brominated isobutylene-co-paramethylstyrene copolymer, can be effectively used as a composition suitable for severe duties such as tire inner tubes.

Accordingly, in one aspect of the present disclosure, inner tubes comprising halogenated isobutylene-co-paramethylstyrene polymer, preferably brominated isobutylene-co-paramethylstyrene polymer (BIMS) exhibit improved heat resistance while retaining the superior barrier properties of butyl inner tubes.

In another aspect, the present invention provides an inner tube comprising a blend of a halogenated isobutylene-co-paramethylstyrene polymer, preferably brominated isobutylene-co-paramethylstyrene polymer, and a second isobutylene based rubber.

In another aspect, the present invention provides a composition that is heat resistant and thermostable and may be used in articles of manufacture that require such properties, such as high temperature hoses, gaskets, seals, and belts.

DETAILED DESCRIPTION OF THE INVENTION

Tire inner tubes are generally defined as inflatable air containers or bladders that are usually positioned between a tire carcass and a tire rim or wheel. Tire inner tubes can be employed in a variety of tires, such as bicycle tires, automobile, and truck tires. Although most automobile and truck tires in the industrialized world are tubeless, many developing nations, such as India, China, Indonesia, and African nations still use tires with inner tubes. In these developing nations, high temperatures, bad roads and extreme conditions of use cause repeated expansion and contraction of the tire inner tubes. As a result, inner tubes made from these polymers have a limited useful life.

In the present invention, compositions comprising halogenated isobutylene-co-paramethylstyrene polymers, preferably brominated isobutylene-co-paramethylstyrene polymers and blends of a second isobutylene based rubber and BIMS, exhibit improved heat resistance while retaining the superior barrier properties of butyl rubber inner tubes. The inner tube may comprise halogenated isobutylene-co-paramethylstyrene polymer, preferably brominated isobutylene-co-paramethylstyrene polymer or a blend comprising a second isobutylene based rubber and BIMS. The inner tube comprising the BIMS alone or the blend comprising at least 15 parts per hundred rubber halogenated isobutylene-co-paramethylstyrene in one embodiment, at least 25 parts per hundred rubber halogenated isobutylene-co-paramethylstyrene in another embodiment, and at least 40 parts per hundred rubber halogenated isobutylene-co-paramethylstyrene in yet another embodiment. As previously stated, the halogenated isobutylene-coparamethylstyrene polymers are preferably brominated isobutylene-co-paramethylstyrene polymers (BIMS). The term parts per hundred rubber or "phr" is well understood in the art.

Isobutylene based polymers, particularly halogenated isobutylene based polymers, and more particularly halogenated butyl rubber are the primary compositions of most tire liners, heat resistant tubes, and other commercially known products such as pharmaceutical ware. The term "butyl rubber" as employed herein is intended to refer to a vulcanizable rubbery copolymer containing, by weight, from about 85% to about 99.5% combined isoolefin having from 4 to 8 carbon atoms, such as a copolymer of isobutylene/isoprene. Such copolymers and their preparation are well known to one skilled in the art. A preferred butyl rubber is shown in the following examples and is commercially available from ExxonMobil Chemical Company as Exxon® Butyl 268 rubber (hereinafter referred to as "Butyl 268" rubber).

Brominated isobutylene-co-paramethylstyrene polymer is well known in the art. The preparation of $C_4$–$C_7$ isoolefin/paralkylstyrene copolymers is generally disclosed, for example, in U.S. Pat. No. 5,162,445 to Powers et al. and U.S. S.I.R H1475 by Newman et al. both of which are incorporated herein by reference for purposes of U.S. patent practice. BIMS with a relatively low level of bromine, at least 0.5 moles percent benzylic bromine relative to the total amount of copolymer present, is commercially available from ExxonMobil Chemical Company as EXXPRO™ elastomer.

According to the one embodiment of the invention, the BIMS has a relatively low bromination level, from 0.1 to 3.0 mol % benzylic bromine (relative to the total amount of copolymer) in one embodiment, and 0.25 to 2.0 mol % in another embodiment, and 0.60 to 1.5 mol % benzylic bromine in yet another embodiment. Below this range, the crosslinking density obtained following vulcanization may be too low to be useful. Above this range, the polymer will be too tightly crosslinked using the same cure package to have useful properties, e.g. it will become stiff or brittle, or there may be unreacted benzylic bromine that can lead to instability. In a tire inner tube this will cause reduced life of the vulcanizate, and undesirably increased adhesion or a tendency to co-cure with halobutyl tire innerliners. Within the range in accordance with the invention, the bromine content, as well as the other polymer properties and the choice of cure package can be adjusted and optimized to obtain desired properties of the resulting vulcanizate.

In general, the bromination level of the BIMS is controlled by limiting the amount of bromine reactant using the procedures and techniques disclosed in U.S. Pat. No. 5,162,445 to Powers et al. and U.S. S.I.R. H1475 by Newman et al. mentioned above.

Halogenation of the base isobutylene-co-paramethylstyrene polymer is one method of functionalizing the polymer for future vulcanization and processing. An alternative preparation of a functionalized isobutylene-co-paramethylstyrene polymer is metallation of the isobutylene-co-paramethylstyrene polymer, as is illustrated by U.S. Pat. Nos. 5,670,581, 5,849,828, 5,821,308, and 5,840,810 to Frechet et al., which are incorporated herein by reference for purposes of U.S. patent practice.

In one embodiment, the BIMS comprises from 0.5 to 10 mol % para-alkylstyrene, from 1.0 to 8.0 mol % in another embodiment, and from 1.5 to 5.0 mol % para-alkylstyrene in another embodiment. In one embodiment the BIMS comprises from 0.1 to 3.0 mol % benzylic bromine, from 0.25 to 2.0 mol % in another embodiment, and 0.6 to 1.5 mol % benzylic bromine in yet another embodiment.

The BIMS used in the present application comprises about 3.75 mol % p-methylstyrene and about 1.2 mol % benzylic bromine (commercially available as EXXPRO™ 3745 elastomer) or 2.5 mol % paramethylstyrene and about 0.75 mol % benzylic bromine (commercially available as EXXPRO™ 7433).

For use in tire inner tubes and other severe duty applications, the BIMS generally has a weight average molecular weight from about 50,000 to about 700,000, from about 300,000 to about 550,000 in one embodiment. Mooney viscosities at 125° C. from 30 to 60 are common, with about 45 in one embodiment. The particular Mooney viscosity of the BIMS will depend on the particular properties desired for the vulcanizate application.

A preferred cure package comprises vulcanizing agents and may further include conventional accelerators, retarders, and activators. Accelerators include, for example, fatty acids such as stearic acid and fatty acid metal salts, tetramethyl thiuram disulfide (TMTD) (commercially available from Flexsys Corp. of Akron, Ohio), bis (2,2'-benzothiazole disulfide) (also available from Flexsys Corp.). Suitable retarders include, but are not limited to, DHT4A2, magnesium aluminum hydroxy carbonate, commercially available from Mitsui Chemical Corp. The accelerators and retarders are used in the cure package from 0 to 12 phr in one embodiment, and from 4 to 10 phr in another embodiment, and in yet another embodiment at 7 phr.

The vulcanizing agent may be any suitable agent, typically sulfur, or zinc oxide, or both in combination. When halogenated isobutylene based rubbers and EXXPRO™ elastomers are used as a blend, the vulcanizing agent is preferably zinc oxide.

The blend of the butyl rubber, BIMS and cure package may also be compounded with reinforcing fillers, such as carbon black (commercially available as N660), oils, napthenic or parraffinic, (preferably FLEXON™ 641, a napthenic oil commercially available from ExxonMobil Chemical Company), waxes and other additives, such as anti-oxidants and anti-ozonants, conventionally used in the manufacture of tire inner tubes and other severe duty elastomers.

The polymer may be prepared using a one step mix, a two-step mix, an internal mixer, a two-roll mix or combinations thereof The inner tube composition is preferably prepared in an internal mixer using a two step mix. A preferred mix procedure comprises preparing a masterbatch of the polymer/polymers, carbon black, and oil. The batch is removed or dumped between 120° C. and 160° C. The master batch is then remixed with the curative package and dumped between 100° C. to 120° C.

The blend of BIMS/curative mixture and/or isobutylene based elastomer is then shaped or molded and cured using conventional shaping and vulcanization equipment. For example, tire inner tubes are preferably extruded and then press cured in a mold.

EXAMPLES

The present invention, while not meant to be limiting by, may be better understood by reference to the following example and Tables.

Isobutylene-co-para-bromomethylstyrene based polymers are resistant to degradation because of their saturated polymer backbone. At normal aging test conditions (125° C.), conventional isobutylene-isoprene rubber, commonly referred to as butyl rubber, and EXXPRO™ formulations showed good physical properties. At severe conditions (150° C.), the former softened while the latter maintained good physical properties. Similar softening of inner tubes has been observed in actual tires and can lead to inseparability of the tube from the casing, with the undesirable result that the casing cannot be retreaded.

Unlike the prior art, the embodiments of the present invention do not require the addition of fatty acids or starch to maintain good thermal stability under severe conditions.

The following Tables 1–5 illustrate the compositional components and various test results for inner tube compounds comprising butyl rubber, blends of butyl rubber and BIMS of approximately 85:15 weight percent and 60:40 weight percent ratios, and butyl rubber/ethylene propylene diene monomer (EPDM) of approximately 85:15 weight percent ratio. The BIMS polymer used in Tables 1–5 is EXXPRO™ elastomer 90-10, commercially available from ExxonMobil Chemical Company. In Table 1, VISTALON™ 2200K elastomer is a terpolymer of ethylene/propylene/EPDM, commercially available from ExxonMobil Chemical Company. In Tables 2 and 3, MBTS is 2-mercaptobenzothiazyl disulfide, ZDEDC is zinc diethyldithiocarbamate, VULTAC™ #5 is a stabilizing additive, an alkyl phenol disulfide commercially available from Pennwalt, and $Zn(St)_2$ is zinc stearate.

Tables 6 illustrates the compositional components and Table 7 illustrates the various test results for inner tube compounds comprising butyl rubber and BIMS. The BIMS polymer used in Table 6 is EXXPRO™ elastomer 89-1, commercially available from ExxonMobil Chemical Company. In Table 6, TMTD is tetramethylthiuram disulfide; DHT4A2 is magnesium aluminum hydroxycarbonate (CAS No. 11097-59-9); PERKALINK™ 900 is a curative agent from Flexsys Corporation of Akron, Ohio.

In the examples provided in the Tables, cure characteristics were evaluated using a Monsanto rheometer ODR (arc 1°). The Mooney scorch tests were conducted on a MDR 2000. Delta torque is the maximum torque (MH) minus minimum torque (ML). Scorch safety (Ts2) is the time at which torque rises 2 torque units (dNm) above ML. Tc(90) is the time to 90 percent of delta torque above minimum torque. 150° C. simulates severe aging temperatures. If it is not age resistant, the compound will fail at about 150° C.

The BIMS-containing compounds shown in Tables 1–7 are age resistant and do not fail at 150° C.

As can be seen, in Tables 3 and 7, the cure kinetics at 170° C. and virgin physical properties can be adjusted to be similar to those of the unblended butyl rubber compound (Butyl 268 rubber, commercially available from ExxonMobil Chemical Company).

The superior heat aging properties of the present invention are illustrated by comparing the unaged 300% Modulus to the 150° C. heat aged 300% Modulus. Table 3 illustrates that the Butyl 268 rubber compound maintains less than 20% of its original 300% Modulus and the EPDM VISTALON™ 2200K compound maintains only 30%. The 15% BIMS composition maintains greater than 20% while the 40% BIMS composition maintains greater than 50% of its 300% Modulus. Table 7 further illustrates the Butyl 268 rubber composition to maintain less than 20% of its original 300% Modulus value after aging at 150° C. The BIMS composition retains between about 60% and 190% of their original 300% Modulus values depending on the cure system used.

The superior heat aging properties are also demonstrated by comparing the unaged Tensile strength to the 150° C. heat aged Tensile strength for each test sample. The Butyl 268 rubber composition maintains less than 20% of its tensile strength upon aging. The Butyl 268/VISTALON™ rubber blend maintains 20% of its tensile strength, the 15% BIMS maintains 20%, the 40% BIMS maintains 40% while the pure BIMS compositions maintain from about 50 to about 100% of their tensile strength upon aging, depending upon the cure system used.

Air impermeability of all butyl rubber/BIMS blends are virtually unchanged versus the unblended butyl rubber compound. The blend of butyl rubber/EP (85:15) demonstrates a significant increase in permeability of about 43%, a highly undesirable result. The addition of EP is well known to improve processability and does so for both innertubes comprising the BIMS elastomer and the blended composition.

The cure rate of the blends is the same or slightly faster with blends comprising butyl rubber/BIMS elastomer. The cure kinetics of the butyl rubber/BIMS elastomer blends may be easily adjusted with cure additives.

TABLE 1

Butyl Rubber/BIMS Blend Formulations

| | Butyl Rubber | | Butyl Rubber/BIMS (85:15) | | | | Butyl Rubber/BIMS (60:40) | | | Butyl/EP (85:15) |
|---|---|---|---|---|---|---|---|---|---|---|
| | | None | Zn(St)2 | ZDEDC | VULTAC™ #5 | | None | ZDEDC | VULTAC™ #5 | |
| Compound No. | 1 | 2 | 3 | 4 | 5 | | 6 | 7 | 8 | 9 |
| Butyl Rubber | 100 | 85 | 85 | 85 | 85 | | 60 | 60 | 60 | 85 |
| BIMS 90-10 | — | 15 | 15 | 15 | 15 | | 40 | 40 | 40 | — |
| VISTALON™ 2200K | 0 | 0 | 0 | 0 | 0 | | 0 | 0 | 0 | 15 |
| Carbon Black (GPF) | 70 | 70 | 70 | 70 | 70 | | 70 | 70 | 70 | 70 |
| Paraffinic Oil (Sunpar 2280) | 25 | 25 | 25 | 25 | 25 | | 25 | 25 | 25 | 25 |
| Stearic Acid | 1 | 1 | 1 | 1 | 1 | | 1 | 1 | 1 | 1 |
| ZnO | 5 | 0 | 0 | 0 | 0 | | 0 | 0 | 0 | 0 |
| Ca(St)$_2$ | 0 | 0 | 0 | 0 | 0 | | 0 | 0 | 0 | 0.5 |

TABLE 2

Cure System

| Cure System Compound No. | Butyl Rubber 1 | Butyl Rubber/BIMS (85:15) None 2 | Butyl Rubber/BIMS (85:15) Zn(St)$_2$ 3 | Butyl Rubber/BIMS (85:15) ZDEDC 4 | Butyl Rubber/BIMS (85:15) VULTAC ™ #5 5 | Butyl Rubber/BIMS (60:40) None 6 | Butyl Rubber/BIMS (60:40) ZDEDC 7 | Butyl Rubber/BIMS (60:40) VULTAC ™ #5 8 | Butyl/EP (85:15) 9 |
|---|---|---|---|---|---|---|---|---|---|
| MBTS | 0.5 | 0.5 | 0.5 | 0.5 | 0.5 | 0.5 | 0.5 | 0.5 | 0.5 |
| Sulfur | 2 | 2 | 2 | 2 | 2 | 2 | 2 | 2 | 1.5 |
| ZnO | 0 | 3 | 3 | 3 | 3 | 3 | 3 | 3 | 0 |
| TMTD | 1 | 1.5 | 1.5 | 1.5 | 1.5 | 1.5 | 1.5 | 1.5 | 1 |
| Zn(St)$_2$ | 0 | 0 | 1 | 0 | 0 | 0 | 0 | 0 | 0 |
| ZDEDC (Ez) | 0 | 0 | 0 | 0.8 | 0 | 0 | 0.8 | 0 | 0 |
| VULTAC ™ #5 | 0 | 0 | 0 | 0 | 1 | 0 | 0 | 1 | 0 |

TABLE 3

Butyl Rubber and Butyl Rubber/BIMS blend Inner Tube-Physical Properties

| Compound No. | Butyl rubber 1 | Butyl/BIMS (85:15) None 2 | Butyl/BIMS (85:15) Zn(St)$_2$ 3 | Butyl/BIMS (85:15) ZDEDC 4 | Butyl/BIMS (85:15) VULTAC ™ #5 5 | Butyl/BIMS (60:40) None 6 | Butyl/BIMS (60:40) ZDEDC 7 | Butyl/BIMS (60:40) VULTAC ™ #5 8 | Butyl/EP (85:15) 9 |
|---|---|---|---|---|---|---|---|---|---|
| Mooney Viscosity | | | | | | | | | |
| ML 1 + 4, 100° C. | 44.7 | 47.7 | 46.9 | 46.0 | 47.3 | 46.1 | 46.3 | 45.9 | 47.8 |
| Mooney Scorch, 125° C. | | | | | | | | | |
| t5, min | 26.0 | 8.2 | 8.1 | 7.9 | 9.8 | 4.5 | 4.1 | 5.2 | 31.2 |
| t35, min | 35.6 | 11.2 | 11.0 | 9.9 | 13.5 | 5.8 | 5.5 | 6.8 | 46.6 |
| Rheometer (170° C., 3 Arc) | | | | | | | | | |
| Ml | 7.4 | 9.9 | 9.5 | 9.6 | 9.6 | 10.4 | 10.7 | 10.2 | 7.7 |
| Mh | 48.4 | 40.4 | 40.4 | 42.9 | 45.9 | 38.3 | 36.8 | 41.5 | 49.8 |
| Ts2, min | 2.0 | 1.3 | 1.3 | 1.2 | 1.3 | 0.9 | 0.9 | 0.9 | 2.1 |
| Tc90, min | 11.6 | 11.8 | 11.8 | 10.1 | 14.9 | 10.6 | 7.7 | 14 | 12.4 |
| Physical Property (cured at 170° C. for optimum) | | | | | | | | | |
| Hardness, Shore A | 49 | 46 | 46 | 47 | 48 | 43 | 43 | 46 | 54 |
| 100% Modulus, MPa | 1.5 | 1.1 | 1.1 | 1.1 | 1.3 | 1.0 | 0.9 | 1.1 | 1.8 |
| 300% Modulus, MPa | 4.9 | 5.2 | 5.1 | 5.1 | 6.0 | 4.8 | 4.4 | 5.2 | 6.4 |
| Tensile Strength, MPa | 13.3 | 12.1 | 12.4 | 11.7 | 11.8 | 12.0 | 11.9 | 12.3 | 12.2 |
| Elongation, % | 710 | 690 | 700 | 660 | 620 | 820 | 810 | 770 | 590 |
| Tear Strength, KN/m | 29.8 | 29.7 | 31.0 | 28.8 | 27.9 | 35.2 | 36.3 | 35.5 | 32.5 |

TABLE 4

Butyl rubber/BIMS blend Inner Tube - Physical Properties

| Aged Physical Property (at 150° C. for 24 hrs) Compound No. | Butyl rubber 1 | Butyl/BIMS (85:15) None 2 | Butyl/BIMS (85:15) Zn(St)$_2$ 3 | Butyl/BIMS (85:15) ZDEDC 4 | Butyl/BIMS (85:15) VULTAC ™ #5 5 | Butyl/BIMS (60:40) None 6 | Butyl/BIMS (60:40) ZDEDC 7 | Butyl/BIMS (60:40) VULTAC ™ #5 8 | Butyl/EP (85:15) 9 |
|---|---|---|---|---|---|---|---|---|---|
| Hardness, Shore A | 33 | 33 | 34 | 34 | 34 | 39 | 38 | 41 | 48 |
| 100% Modulus, MPa | 0.3 | 0.4 | 0.4 | 0.4 | 0.5 | 0.8 | 0.7 | 0.9 | 1.1 |
| 300% Modulus, MPa | 0.8 | 1 | 1.2 | 1.1 | 1.5 | 3.1 | 2.3 | 3.7 | 2.1 |
| Tensile Strength, MPa | 2.0 | 2.4 | 2.7 | 2.5 | 2.7 | 5.3 | 4.3 | 5.4 | 2.4 |
| Elongation, % | 830 | 720 | 690 | 710 | 600 | 500 | 470 | 470 | 420 |
| Tear Strength, KN/m | 8.9 | 11.9 | 13.6 | 12.6 | 13.0 | 17.3 | 17.0 | 17.2 | 12.9 |

TABLE 5

Butyl Rubber/BIMS Blend - Physical Properties

| | | Butyl/BIMS (85/15) | | | | Butyl Rubber/BIMS (60/40) | | | |
|---|---|---|---|---|---|---|---|---|---|
| Compound No. | Butyl rubber 1 | None 2 | Zn(St)$_2$ 3 | ZDEDC 4 | VULTAC ™ #5 5 | None 6 | ZDEDC 7 | VULTAC ™ #5 8 | Butyl/EP (85/15) 9 |
| Air Permeability (at 65° C.) ml (STP) mm/m$^2$ · atm · hour | 17.6 | 17.5 | 17.8 | 17.7 | 17.4 | 17.1 | 17.4 | 17.3 | 25.1 |
| Tack (Picma Tack, RT) | 1.53 | 1.02 | 1.04 | 0.92 | 0.85 | 0.88 | 0.65 | 0.66 | 0.75 |
| Ozone Resistance 40° C., 50 pphm, 72 hrs | N/C* | N/C | N/C | N/C | N/C | N/C | N/C | N/C | N/C |

*NC = No change

TABLE 6

Inner Tube Composition Comprising Isobutylene-Based Polymers versus BIMS Polymer

| Composition | 10 | 11 | 12 | 13 | 14 |
|---|---|---|---|---|---|
| Butyl Rubber | 100 | — | — | — | — |
| BIMS | — | 100 | 100 | 100 | 100 |
| N660 | 70 | 70 | 70 | 70 | 80 |
| FLEXON ™ 641 | 25 | 25 | 25 | 25 | 25 |
| PERKALINK ™ 900 | — | 0.7 | 0.7 | — | 0.7 |
| Stearic Acid | 1 | 0.5 | 0.5 | 0.5 | 0.5 |
| Zinc Oxide | 5 | 3 | 3 | 3 | 3 |
| Sulfur | 2 | — | — | — | — |
| TMTD | 1 | 1 | 1 | 1 | 1 |
| MBTS | 0.5 | 1.5 | 1.8 | 1.5 | 1.5 |
| DHT4A2 | — | 1 | 1.5 | 1 | 1.5 |

Examples 11–14 shown in Table 6 are examples of butyl rubber alone (Example 10) and BIMS alone (Examples 11–14). As is illustrated in Table 7, the comparative data clearly depicts the unexpected results of superior heat aging properties of compositions 11–14, which comprise 100% BIMS versus the composition comprising only butyl rubber (10). The following data illustrate that at normal aging conditions of 125° C., both the butyl rubber polymer and the BIMS polymer maintain good physical properties. However, at severe aging conditions of 150° C., the butyl polymer formulation tends to soften extensively while the BIMS polymer formulation maintains its good physical properties. More specifically, Composition 11, comprising 100% BIMS (or EXXPRO™ elastomer), demonstrates an enormous superiority under severe aging conditions (i.e. Age 72 hrs @150° C.).

TABLE 7

Inner Tube Performance

| COMPOSITION | 10 | 11 | 12 | 13 | 14 |
|---|---|---|---|---|---|
| MS @ 125° C., Δ5 | 33.1 | 24.5 | 41.4 | 19.8 | 36.1 |
| Rheometer @ 170° C., 3° Arc | | | | | |
| ML | 7 | 5 | 5 | 5 | 6 |
| MH | 53 | 26 | 27 | 22 | 2.1 |
| T2 | 2.6 | 3.1 | 4.3 | 2.9 | 5.7 |
| T25 | 3.8 | 4.1 | 6.0 | 3.6 | 7.1 |
| T50 | 4.7 | 5.2 | 7.7 | 4.5 | 9.1 |
| T90 | 13.1 | 8.0 | 14.0 | 6.7 | 12.1 |

TABLE 7-continued

Inner Tube Performance

| COMPOSITION | 10 | 11 | 12 | 13 | 14 |
|---|---|---|---|---|---|
| Cure Tc90 + 2 @ 170° C. | | | | | |
| Shore A | 58 | 55 | 54 | 57 | 65 |
| Tensile, MPa | 10.5 | 8.1 | 7.7 | 7.7 | 8.7 |
| 300% Modulus, MPa | 5.9 | 4.7 | 4.0 | 4.6 | 7.4 |
| % Elongation | 540 | 590 | 630 | 540 | 380 |
| Age 192 hrs @ 125° C. | | | | | |
| Shore A | 60 | 70 | 68 | 73 | 79 |
| Tensile, MPa | 6.6 | 9.9 | 6.4 | 8.8 | 5.5 |
| 300% Modulus, MPa | 5.4 | 8.6 | 5.7 | 7.4 | 5.5 |
| % Elongation | 410 | 370 | 440 | 420 | 390 |
| Age 72 hrs @ 150° C. | | | | | |
| Shore A | 51 | 77 | 71 | 67 | 75 |
| Tensile, MPa | 0.82 | 8.53 | 8.25 | 6.22 | 4.49 |
| 300% Modulus, MPa | 0.77 | 8.07 | 7.57 | 5.71 | 4.60 |
| % Elongation | 530 | 330 | 370 | 430 | 360 |

As illustrated, inner tubes comprising 100% BIMS (Compositions 11–14) exhibit superior results (8.53 NPa, 8.25 MPa, 6.22 MPa, and 4.49 MPa aged Tensile strength ) compared to the inner tubes comprising butyl rubber and no BIMS (0.82 MPa) under similar severe conditions (Age 72 hrs@ 150° C.). When aged at 150° C., the butyl rubber inner tubes degraded from a tensile strength of 10.5 MPa to 0.82 MPa. No such degradation is seen with the aged BIMS samples.

While the invention has been shown and described with respect to particular embodiments thereof, those embodiments are for the purpose of illustration rather than limitation, and other variations and modifications of the specific embodiments herein described will be apparent to those skilled in the art, all within the intended spirit and scope of the invention. Accordingly, the invention is not to be limited in scope and effect to the specific embodiments herein described, nor in any other way that is inconsistent with the extent to which the progress in the art has been advanced by the invention.

We claim:

1. An inner tube comprising a blend comprising:
   butyl rubber;
   a halogenated isobutylene-co-paramethylstyrene polymer; and
   a reinforcing filler;
   wherein the inner tube comprises at least 15 parts per hundred rubber of the halogenated isobutylene-co-paramethylstyrene polymer; and wherein the halogen is present from 0.1 to 3.0 mol % relative to the total amount of the halogenated isobutylene-co-paramethylstyrene polymer.

2. The inner tube of claim 1, wherein the halogenated isobutylene-co-paramethylstyrene is brominated isobutylene-co-paramethylstyrene polymer.

3. The inner tube of claim 1, comprising at least 25 parts per hundred rubber halogenated isobutylene-co-paramethylstyrene polymer.

4. The inner tube of claim 1, comprising at least 40 parts per hundred rubber halogenated isobutylene-co-paramethylstyrene polymer.

5. The inner tube of claim 1, further comprising a vulcanizing agent, a retarder, a filler, a cure package, or blends thereof.

6. An inner tube comprising a blend comprising:
a first isobutylene based rubber;
a halogenated isobutylene-co-paramethylstyrene polymer; and
a reinforcing filler;
wherein the halogenated isobutylene-co-paramethylstyrene polymer is present in the blend from about 15 parts per hundred rubber to about 40 parts per hundred rubber; and
wherein the halogen is present from 0.1 to 3.0 mol % relative to the total amount of the halogenated isobutylene-co-paramethylstyrene polymer.

7. The inner tube of claim 6, wherein the halogenated isobutylene-co-paramethylstyrene is brominated isobutylene-co-paramethylstyrene polymer.

8. The inner tube of claim 6, wherein the first isobutylene based rubber comprises a copolymer of isobutylene/isoprene.

9. The inner tube of claim 6, wherein the first isobutylene based rubber comprises at least 80 weight % of the blend.

10. The inner tube of claim 6, wherein the blend further comprises a cure package.

11. The inner tube of claim 10, wherein the blend further comprises a vulcanizing agent, a retarder, a filler, or blends thereof.

12. A tire assembly comprising:
a) a tire; and
b) an inner tube comprising a blend comprising:
butyl rubber;
a halogenated isobutylene-co-paramethylstyrene polymer; and
a reinforcing filler:
wherein the inner tube comprises at least 15 parts per hundred rubber of the halogenated isobutylene-co-paramethylstyrene polymer; and
wherein the halogen is present from 0.1 to 3.0 mol % relative to the total amount of the halogenated isobutylene-co-paramethylstyrene polymer.

13. The tire assembly of claim 12, wherein the halogenated isobutylene-co-paramethylstyrene is brominated isobutylene-co-paramethylstyrene polymer.

14. An inner tube comprising a blend comprising:
butyl rubber;
brominated isobutylene-co-paramethylstyrene polymer; and
a reinforcing filler;
wherein the brominated isobutylene-co-paramethylstyrene polymer is present in the blend from about 15 parts per hundred rubber to about 40 parts per hundred rubber; and
wherein the bromine is present from 0.1 to 3.0 mol % relative to the total amount of the brominated isobutylene-co-paramethylstyrene polymer.

15. The inner tube of claim 14, further comprising a cure package.

16. The inner tube of claim 14, further comprising a vulcanizing agent, a retarder, a filler, or blends thereof.

17. A tire assembly comprising:
a) a tire; and
b) an inner tube comprising a blend comprising:
butyl rubber;
a halogenated isobutylene-co-paramethylstyrene polymer; and
a reinforcing filler;
wherein the halogenated isobutylene-co-paramethylstyrene polymer is present in the blend from about 15 parts per hundred rubber to about 40 parts per hundred rubber; and
wherein the halogen is present from 0.1 to 3.0 mol % relative to the total amount of the halogenated isobutylene-co-paramethylstyrene polymer.

18. The inner tube of claim 17, wherein the halogenated isobutylene-co-paramethylstyrene is a brominated isobutylene-co-paramethylstyrene polymer.

19. The inner tube of claim 17, further comprising a cure package.

20. The inner tube of claim 17, further comprising a vulcanizing agent, a retarder, a filler, or blends thereof.

* * * * *